United States Patent [19]
Fanning et al.

[11] Patent Number: 5,642,011
[45] Date of Patent: Jun. 24, 1997

[54] DOUBLE-STATOR ELECTROMAGNETIC PUMP HAVING ALIGNMENT RING AND SPINE ASSEMBLY

[75] Inventors: Alan Wayne Fanning, San Jose; Eugene Ellsworth Olich, Aptos; Leslie Roy Dahl, Livermore; Mahadeo Ratilal Patel, San Jose, all of Calif.

[73] Assignee: General Electric Company, San Jose, Calif.

[21] Appl. No.: 334,644

[22] Filed: Nov. 4, 1994

Related U.S. Application Data

[63] Continuation-in-part of Ser. No. 3,994, Jan. 19, 1993, Pat. No. 5,382,860, which is a continuation-in-part of Ser. No. 836,475, Feb. 18, 1992, Pat. No. 5,195,231.

[51] Int. Cl.$^6$ .............................. H02K 44/02; H02K 1/00; H02K 1/06
[52] U.S. Cl. .............................. 310/216; 310/11; 310/217; 417/50
[58] Field of Search .............................. 310/11, 216, 217; 417/50; 164/147.1; 376/330

[56] References Cited

U.S. PATENT DOCUMENTS

| | | | |
|---|---|---|---|
| 2,987,001 | 6/1961 | Blake | 310/11 |
| 3,302,573 | 2/1967 | Ledeen | 310/11 |
| 4,166,714 | 9/1979 | Reinass et al. | 417/50 |
| 4,212,592 | 7/1980 | Olich et al. | 417/50 |
| 4,508,677 | 4/1985 | Craig et al. | 376/174 |
| 4,557,667 | 12/1985 | Delassus et al. | 417/50 |
| 4,859,885 | 8/1989 | Kliman et al. | 310/11 |
| 4,882,514 | 11/1989 | Brynsvold et al. | 310/208 |
| 5,066,882 | 11/1991 | Sargeant | 310/217 |

FOREIGN PATENT DOCUMENTS

| | | |
|---|---|---|
| 0345916 | 12/1989 | European Pat. Off. . |
| 2362524 | 3/1978 | France . |
| 468292 | 3/1926 | Germany . |
| 1912251 | 11/1970 | Germany . |
| 804625 | 11/1958 | United Kingdom . |

OTHER PUBLICATIONS

Patent Abstracts of Japan, vol. 11, No. 113 (E–49) (2560) Apr. 9, 1987 & JP–A–61–262063 (Hitachi).

*Primary Examiner*—Clayton E. LaBalle
*Attorney, Agent, or Firm*—James E. McGinness

[57] ABSTRACT

A support structure for clamping the inner coils and inner lamination rings of an inner stator column of an electromagnetic induction pump to prevent damaging vibration. A spine assembly, including a base plate, a center post and a plurality of ribs, serves as the structural frame for the inner stator. Stacked alignment rings provide structure to the lamination rings and locate them concentrically around the spine assembly central axis. The alignment rings are made of a material having a high thermal expansion coefficient to compensate for the lower expansion of the lamination rings and, overall, provide an approximate match to the expansion of the inner flow duct. The net result is that the radial clamping provided by the duct around the stator iron is maintained (approximately) over a range of temperatures and operating conditions. Axial clamping of the inner stator structure is achieved via tie rods which run through grooves in the ribs and engage the base plate at the bottom of the inner stator and engage a clamping plate at the top. Slender tie rods and a flexible clamping plate are used to provide compliance in the axial clamping system to accommodate differential thermal growth (axially) between the tie rods and lamination ring elements without losing clamping force.

20 Claims, 7 Drawing Sheets

DOUBLE-STATOR ELECTROMAGNETIC PUMP HAVING ALIGNMENT RING AND SPINE ASSEMBLY

RELATED PATENT APPLICATION

This application is a continuation-in-part application of U.S. patent application Ser. No. 08/003,994 filed on Jan. 19, 1993, now U.S. Pat. No. 5,382,860, which is a continuation-in-part application of U.S. patent application Ser. No. 07/836,475 filed on Feb. 18, 1992, now issued as U.S. Pat. No. 5,195,231.

The Government of the United States of America has rights in this invention in accordance with Contract No. DE-AC03-89SF17445 awarded by the Department of Energy.

FIELD OF THE INVENTION

This invention is generally related to improvements in annular linear-flow electromagnetic induction pumps such as the type commonly used to circulate electrically conducting liquid metal coolant through a liquid metal-cooled nuclear fission reactor plant.

BACKGROUND OF THE INVENTION

Annular linear flow electromagnetic induction pumps for impelling liquid metals generally comprise an annular flow channel or duct which is surrounded by a stator column composed of a multiplicity of alternating annular coils and magnetic iron rings. This type of electromagnetic pump, commonly known as a single-stator, annular linear-flow induction pump, and its use in a liquid metal-cooled nuclear fission reactor, are disclosed in U.S. Pat. Nos. 4,859,885 and 4,882,514.

However, a more versatile linear-flow electromagnetic induction pump design than those shown in the above patents comprises a double-stator system. This electromagnetic pump system comprises an outer stator arrangement surrounding the outer flow duct of an annular flow channel and an inner stator arrangement concentric with the outer stator and enclosed within the inner duct of the annular flow channel. The inner and outer stator columns are each composed of a multiplicity of alternating annular coils and iron lamination rings. In combination, the outer and inner, or double, stators act upon the liquid metal flowing linearly through the annular flow duct.

This double-stator pump design provides greater pumping capacity per pump unit size, or alternatively equal capacity provided by a smaller pump unit. Accordingly, among the advantages of the double-stator pump are greater efficiency and versatility.

In the single-stator design, the stator column surrounds the outer flow duct of the annular flow channel. Because the outer flow duct is made of metal having a thermal expansion coefficient greater than that of the carbon steel of the lamination rings therearound, the outer flow duct expands radially outward more than the lamination rings expand, causing the outer flow duct to exert a radially outward clamping force on the lamination rings.

However, when the lamination rings are radially inward of the inner flow duct, as is the case for the double-stator design, the tendency—in the absence of remedial measures—is for radial clamping by the inner flow duct to be lost as the inner stator is brought up to operating temperature. In addition to radial clamping, means for axially and circumferentially clamping the coils and lamination rings of the inner stator structure must be provided.

SUMMARY OF THE INVENTION

The present invention is a support structure for clamping the inner coils and inner lamination rings of an inner stator column of an electromagnetic induction pump to prevent damaging vibration. In accordance with the invention, clamping is provided in the axial, radial and circumferential directions.

In accordance with the preferred embodiment of the invention, a spine assembly comprising a base plate, a center post and a plurality of ribs serves as the structural frame for an inner stator. This frame provides lateral rigidity against seismic loading and a means of hanging the inner stator from above.

Further, a plurality of stacked alignment rings are used to provide structure to the lamination rings and locate them concentrically around the spine assembly central axis. The spine assembly is machined to provide a true cylindrical form over which the lamination rings are installed.

A further aspect of the invention is that the alignment rings are made of a material having a high thermal expansion coefficient (such as Type 304 stainless steel). This choice of material, in combination with the higher operating temperature at the interior of the inner stator, compensates for the lower expansion of the carbon steel of the lamination rings and, overall, provides an approximate match to the expansion of the Type 304 stainless steel inner flow duct. The net result, then, is that the radial clamping provided by the duct around the stator iron is maintained (approximately) over a range of temperatures and operating conditions.

Each lamination ring comprises a plurality of lamination packages which are attached to an associated alignment ring by mechanical fasteners. Registration of the lamination packages to the alignment rings is achieved via interlocking geometry. Additional radial clamping of the lamination packages is achieved by capturing them between the alignment rings and the shrink-fitted inner flow duct.

Axial clamping of the inner stator structure is achieved via tie rods which run through grooves in the ribs and engage the base plate at the bottom of the inner stator and engage a clamping plate at the top. Alloy 600 is used for the tie rods to match the thermal expansion coefficient of the carbon steel elements of the lamination rings while providing high-temperature structural stability (i.e. creep resistance).

In accordance with another aspect of the invention, slender tie rods and a flexible clamping plate are used to provide compliance in the axial clamping system to accommodate differential thermal growth (axially) between the tie rods and lamination ring elements without losing clamping force. Additional axial clamping is achieved as a result of shrink fitting the inner flow duct onto the inner stator column, so that duct shrinkage in the axial direction during cooling puts the inner stator structure in axial compression.

Finally, the geometries of the spine, ribs and alignment rings create a plurality of coil-to-coil connection "bays". The number of these bays must be at least equal to (could be greater than) the number of power phases being used in the pump, with one power phase per bay. Furthermore, the number of ribs/bays should be divisible into the number of lamination packages by an integer number to avoid interferences.

DETAILED DESCRIPTION OF THE PREFERRED EMBODIMENTS

Figure 1:
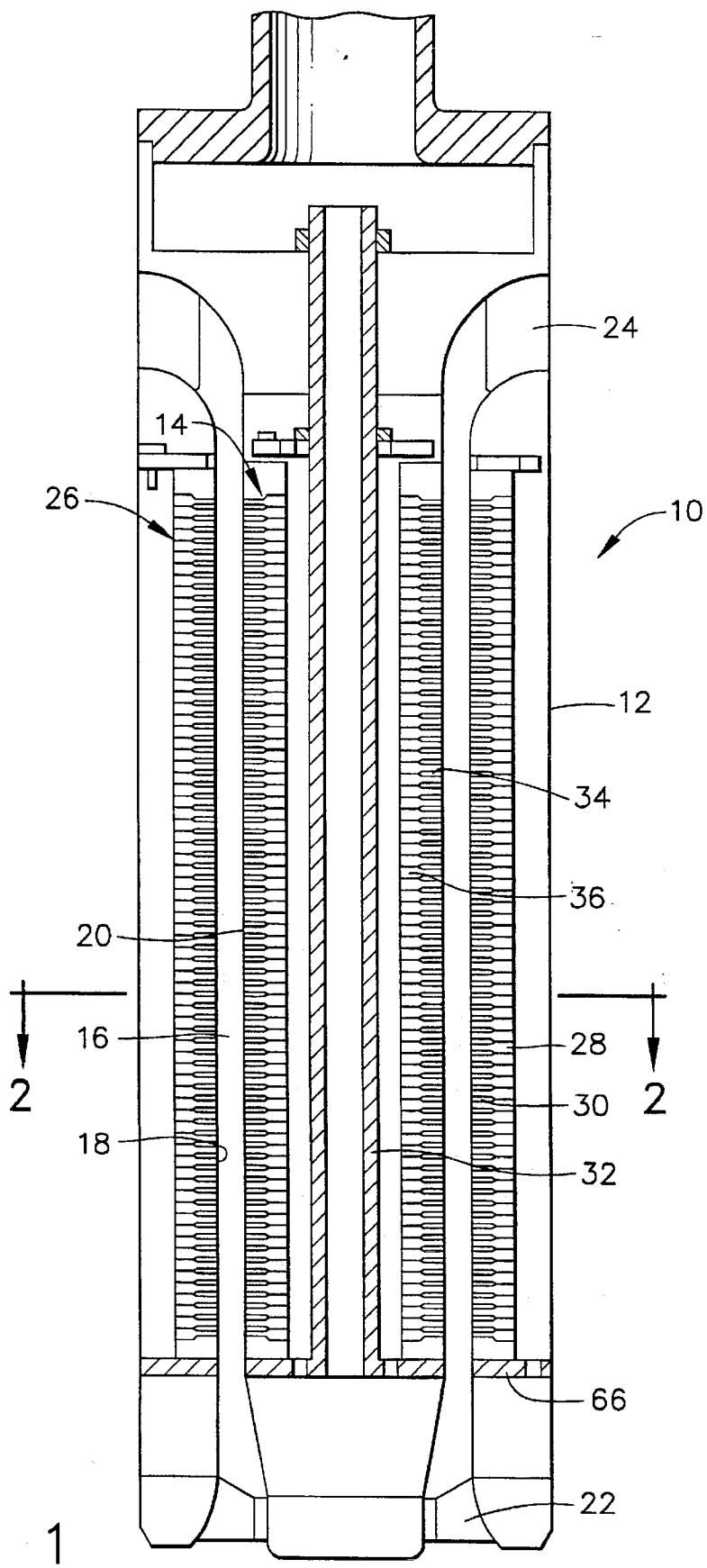
FIG. 1 is a schematic representation of a double-stator annular linear flow electromagnetic pump in accordance with the invention.

Referring to FIG. 1, a double stator annular linear flow, electromagnetic induction pump 10 for service in electrically conductive liquid metal systems typically comprises the following assemblage of components. A pump housing 12, commonly a cylindrical unit, encloses the electromagnetic induction system and provides the necessary protection to enable the pump to operate submerged within the aggressive environment of liquid sodium, which is commonly utilized as the coolant medium in liquid metal cooled nuclear fission reactors. An inner stator 14 is secured and supported by means of a central support post or spine 32, to be described in detail below.

The double-stator electromagnetic pump 10 contains an annular flow channel 16 for magnetically impelling the passage of liquid metal therethrough. Annular flow channel 16 is defined by an outer flow duct 18 and an inner flow duct 20 concentric therewith. An inlet 22 provides entry to the annular flow channel 16, and outlet 24 provides for discharge therefrom, whereby the induced linear flow of liquid metal through the pump is effected generally upwardly from inlet 22 to outlet 24.

Figure 4:
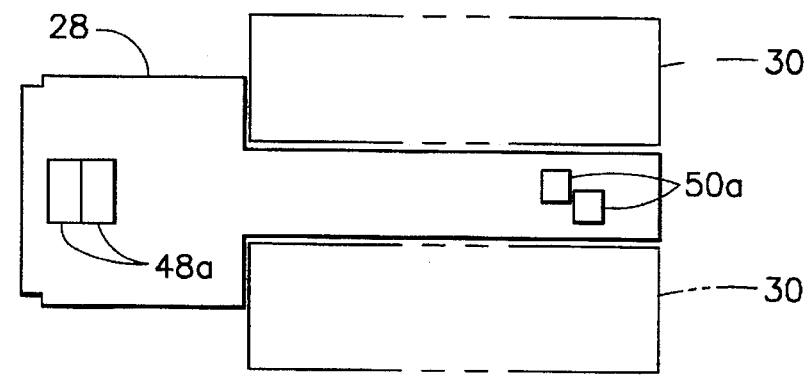
FIG. 4 is an elevation view of an individual package of inner lamination ring elements in accordance with a preferred embodiment of the invention.

An outer stator 26 comprises an annular column positioned between the pump housing 12 and the outer flow duct 18, and extends circumferentially around the outside of duct 18. Outer stator 26 can be generally conventional in design, comprising a multiplicity of alternately stacked annular stator units having outer lamination rings 28 and outer coils 30, as shown in FIG. 4. The outer coils 30 commonly consist of electrical conductor strips or ribbons of copper metal wound upon itself into a suitably sized and coiled unit and wrapped in electrical insulation. The coil terminals or power leads extend from the outer periphery of the outer coil 30. The outer lamination rings 28 commonly include thin iron lamination elements which are aligned side-by-side and laminated into composite units. The iron lamination elements can be laminated into a continuous composite ring or into a number of individual composite units or packages which in turn are assembled together into a ring configuration.

In a conventional single-stator electromagnetic pump, the stator lamination rings and stator coils are alternately stacked superimposed upon each other, forming a column surrounding the outer flow duct. This single column of stator coils and lamination rings external to the annular flow channel provides a means of producing the magnetic field and forces which impel liquid metal through the pump.

In accordance with the double-stator pump of the present invention, the inner stator 14 comprises an annular column located circumferentially within and surrounded by inner flow duct 20. Inner stator 14, similar to outer stator 26, typically consists of inner coils 34 of electrical conductor strips or ribbons of copper metal insulated and wound upon or within itself into suitably sized and coiled units having terminals or leads extending from inside the coils 34. The inner stator 14 also includes a plurality of lamination rings 36 (see FIG. 1), each comprising a multiplicity of thin iron lamination elements aligned side-by-side and laminated into packages, a plurality of such packages forming a continuous composite ring. Inner stator coils 34 and lamination rings 36 are alternately stacked superimposed upon each other, forming an annular column enclosed within and surrounded by the inner flow duct 20. Coils 34 are insulated from lamination rings 36.

Although outer stator 26 and inner stator 14 are built or assembled in a similar manner from comparable components, namely, alternately stacked conducting copper coils 30, 34 with insulated magnetic lamination rings 28, 36 in an annular column, significantly different circumstances or factors need to be coped with during their assembly and operation. For example, with the outer stator 26, the alignment of succeeding layers of coils 30 and lamination rings 28 is assured by the fact that these annular components are installed around the outside of the cylindrical outer flow duct 18. However, concerning the inner stator 14, the inner flow duct 20 is external to the inner stator stack or column and is not installed around the stator unit until after the stator unit has been assembled and its wiring has been completed. Thus, means for aligning the inner stator components are required.

Additionally, heat transfer from the outer and inner stators of a double-stator electromagnetic pump to the liquid metal impelled through the annular flow channel 16 is substantially dependent upon clearances existing at the interface between the respective stator and the annular flow channel. Namely, large gaps will reduce heat transfer and result in an increase in stator temperature, whereas smaller gaps will produce the opposite effect.

The gap at the outer stator/outer flow duct interface is minimized by the advantageous condition that typical duct materials, such as stainless steel, have a high thermal expansion coefficient and typical stator iron materials have a lower thermal expansion coefficient. Thus, as the pump is brought up to operating temperature, thermal growth of outer flow duct 18 exceeds that of outer stator 26, ensuring a close fit at the interface.

However, regarding the inner stator 14 of the double-stator induction pump, the use of the same or similar component materials would result in the reverse situation, that is, the inner flow duct 20 would move away from the inner lamination rings 36 as the pump 10 is brought up to operating temperature. Further complicating this scenario is the requirement that the outer and inner flow ducts be made of the same material to avoid significant differential thermal expansion between them, whereby the size of the annular flow channel 16 through the pump would be subject to change. Therefore, there is a decided need to provide an inner stator design that minimizes the gap at the inner lamination ring/inner flow duct interface at pump operating temperatures.

The inner coils 34 have their electrical terminals or leads projecting inwardly since the inner flow duct 20 prevents access to the outer circumference of each inner coil 34. The ends of each coil 34 are used to provide the terminals for connection to a power source (not shown). Moreover, the coils 34 are preferably produced by winding strips or ribbons of copper or other similar metal in two or more tiers or layers either by multiple windings or combining two or more tiers, one superimposed upon the other.

Figure 5:
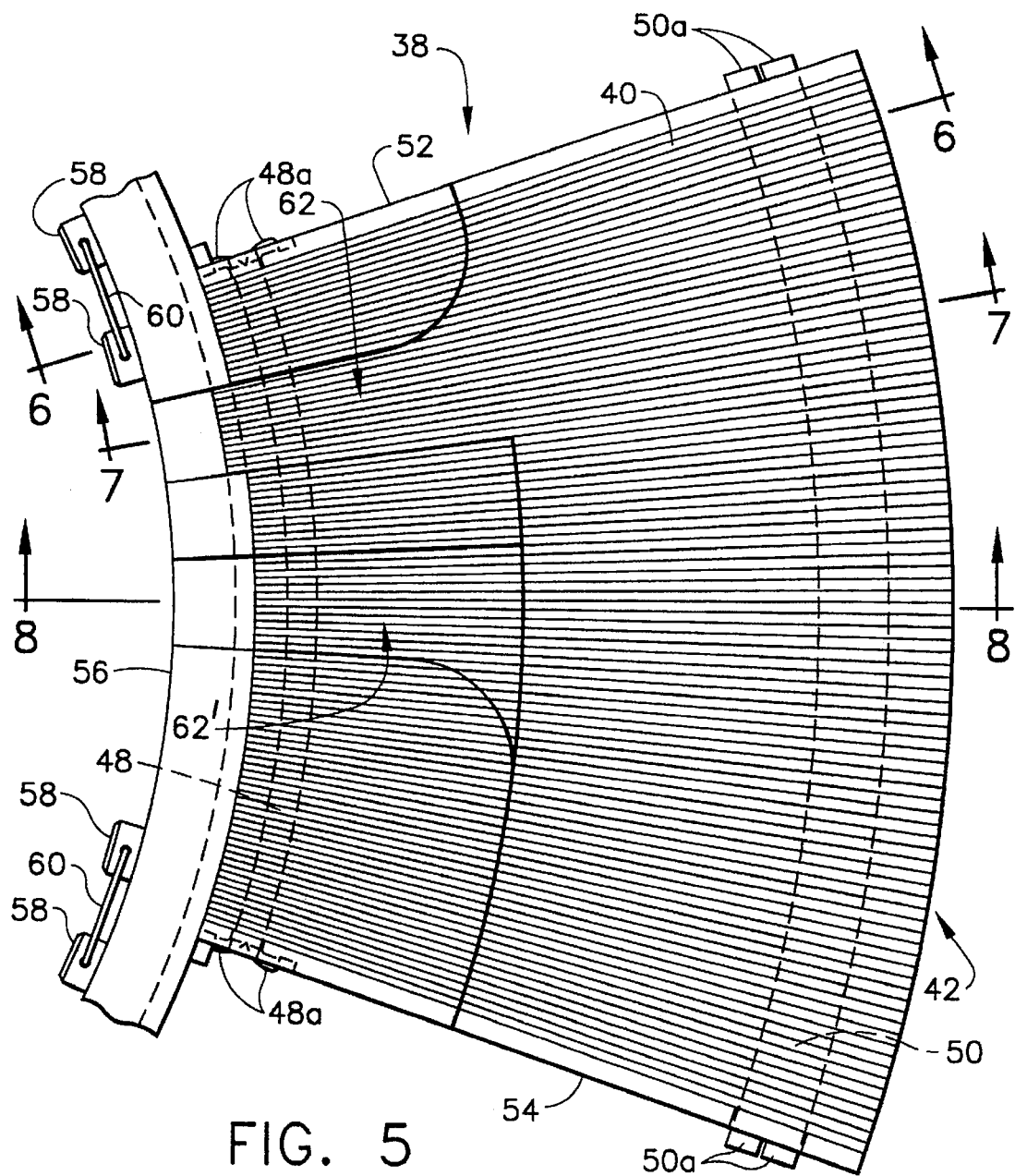
FIG. 5 is a top view of an inner lamination ring package bolted to an alignment ring in accordance with the preferred embodiment of the invention.

In accordance with the preferred embodiment of the invention, an inner lamination ring 36 is fabricated by joining a plurality of lamination packages 38 into an annular configuration, each lamination package comprising a multiplicity of lamination elements 40 as shown in FIG. 5. Each lamination element is a tapered plate having first and second planar radial surfaces which lie in respective radial planes intersecting a centerline axis of said stator core. Within the lamination package, the first planar radial surface of each lamination element is in contact with and opposes the second planar radial surface of an adjacent lamination element. The first and second planar radial surfaces are disposed at an acute angle relative to each other, thus forming a wedge-shaped element (as seen in FIG. 5) having a thickness which increases linearly from an inner edge 40a toward an outer edge 40b and which is constant across the height of the element. Each lamination element 40 has a key-shaped profile with a generally square back adjacent the inner edge and an elongate, rectangular shank or tooth portion extending therefrom to the outer edge, as seen in FIGS. 6–8.

To assemble the inner lamination ring, each lamination element is sandwiched between a pair of adjacent lamination elements to form an annular configuration. The individual lamination elements of the assembled ring are preferably laminated together by mechanical means. Alternatively, the lamination elements could be bonded using a suitable ceramic adhesive.

The completed inner lamination ring 36 is a full ring which is interposed between adjacent ones of the inner coils 34 and supports the coil 34 seated thereon. Magnetic flux, produced by passing electrical current through the coils, is channeled through the inner lamination ring 36. The outer edges of the assembled lamination elements are located at the same radius from the pump centerline axis and thus form a substantially continuous outer circumference 42. This substantially continuous outer circumference provides for uniform channeling of magnetic flux through the inner stator and into the flow channel 16 with small eddy current losses.

Figure 6:
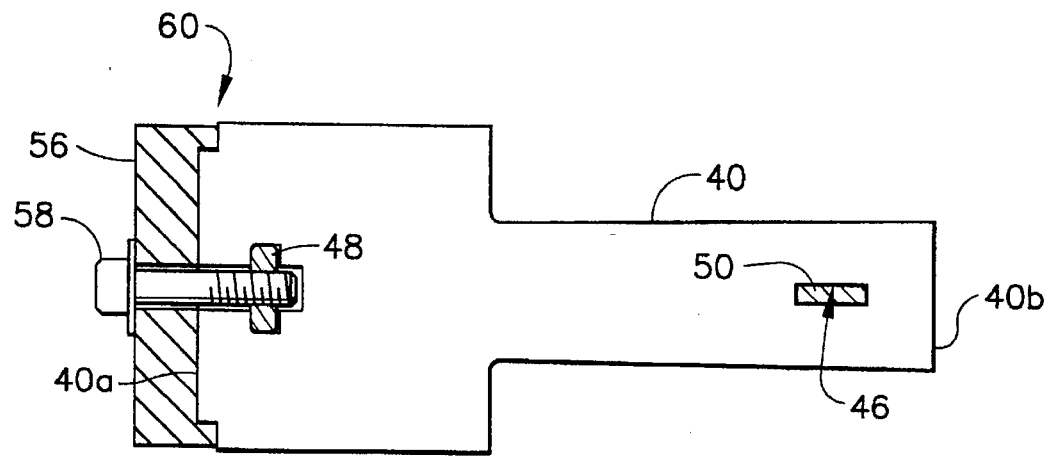
FIGS. 6, 7 and 8 are sectional views respectively taken along section lines 6—6, 7—7 and 8—8 seen in FIG. 5.
Figure 7:
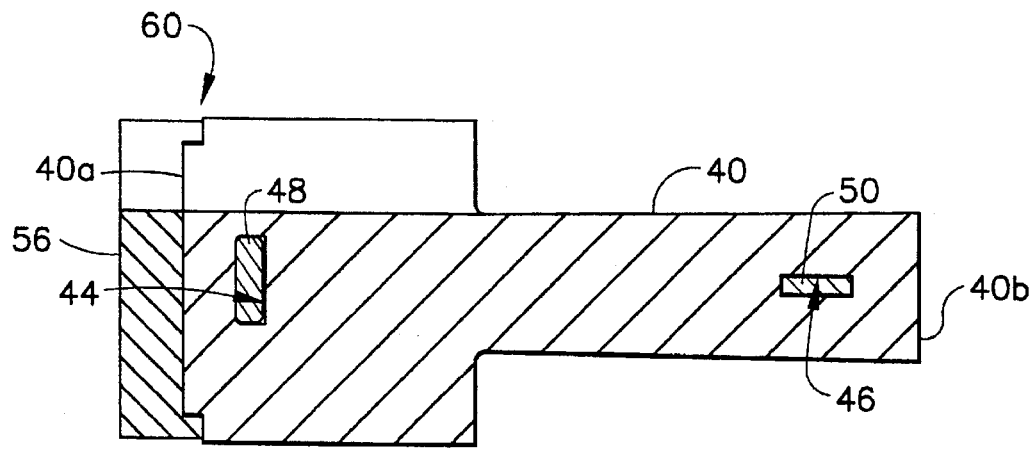
Figure 8:
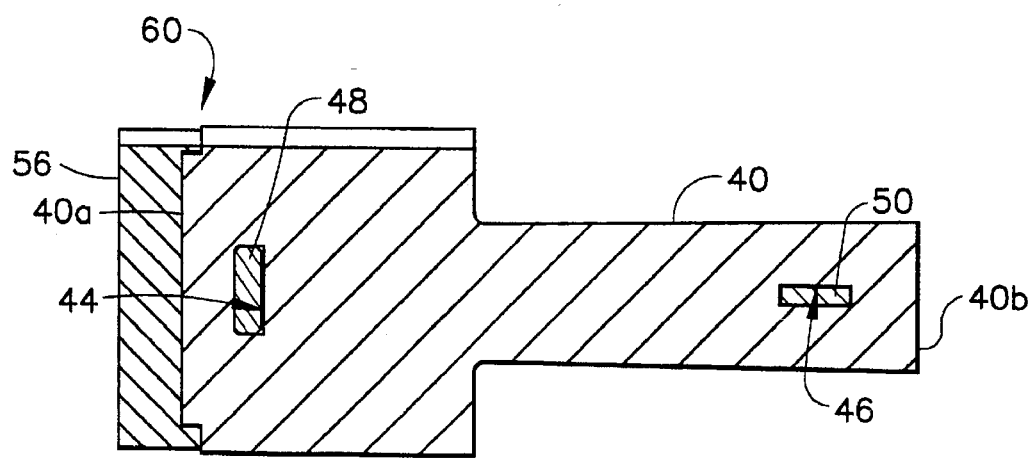

As seen in FIGS. 6 and 7, each lamination element 40 of inner lamination ring 38 has radially inner and outer slots 44 and 46 for receiving a respective pair of arcuate tie strips 48 and 50 (see FIG. 5). As seen in FIG. 5, each lamination package 38 has two end plates 52 and 54 for allowing the tie strips 48 and 50 to sandwich and clamp together the lamination elements 40 of a package.

The slots 44 and 46 are preferably elongated and oriented with their narrowest dimension perpendicular to the magnetic flux path. More specifically, the inner slots 44 have their longer dimension extending parallel to the centerline axis of the assembled inner lamination ring 36, with the narrower dimension being disposed radially or perpendicularly to the centerline axis. However, the outer slots 46 have their longer dimension extending radially or perpendicularly to the centerline axis, with their narrower dimension extending parallel to the centerline axis. In this way, the tie strips 48 and 50 will have minimal adverse effect on the magnetic flux path through the inner lamination ring 36.

The strips 48 and 50, in accordance with the preferred embodiment, may be used as desired in either the inner or outer holes through the lamination packages 38 where mechanical fastening is desired to rigidly clamp the lamination elements 40 together. Each strip has tabs 48a and 50a, respectively, which can be bent or deformed to clamp the respective strip inside the respective openings in the lamination elements.

Figure 3:
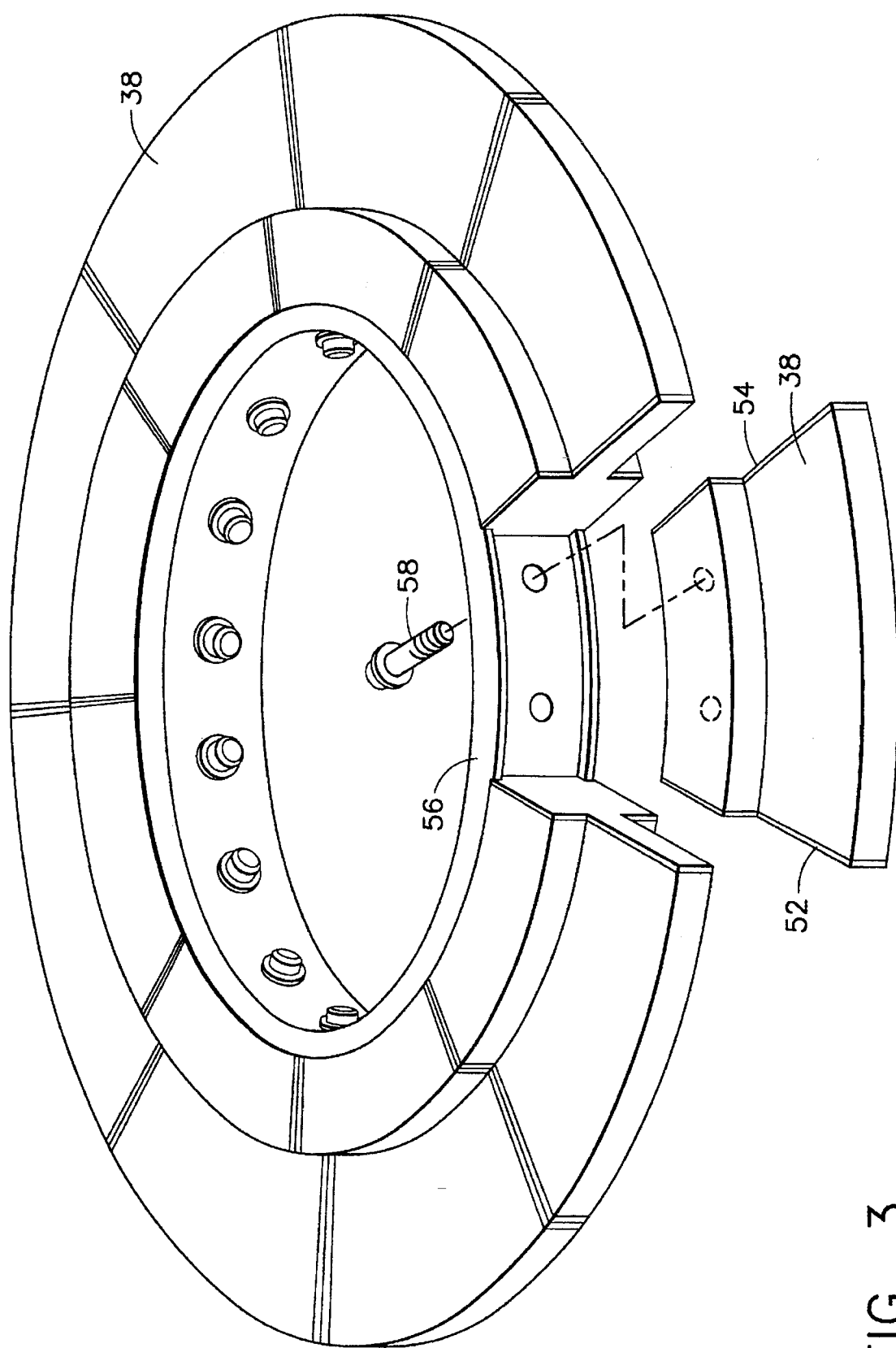
FIG. 3 is a partially exploded view of part of the inner stator structure shown in FIG. 2, illustrating bolting of individual packages of inner lamination ring elements to an alignment ring.

To mitigate against possible damage due to vibrations, it is highly desirable to clamp the lamination packages securely when the inner lamination ring 36 is assembled. This function can be provided by pulling the radially inner surface of each lamination package 38 up against the outside diameter of an alignment ring 56 as shown in FIGS. 3 and 5. This may be accomplished with radially oriented bolts 58 extending from the inside diameter of the alignment ring 56 into tapped holes formed in strip 48, as seen in FIG. 6. Rotation of bolts 58 is prevented by anti-rotation loops 60 (see FIG. 5). The alignment ring 56 thus becomes an integral part of the inner stator lamination ring assembly.

Figure 2:
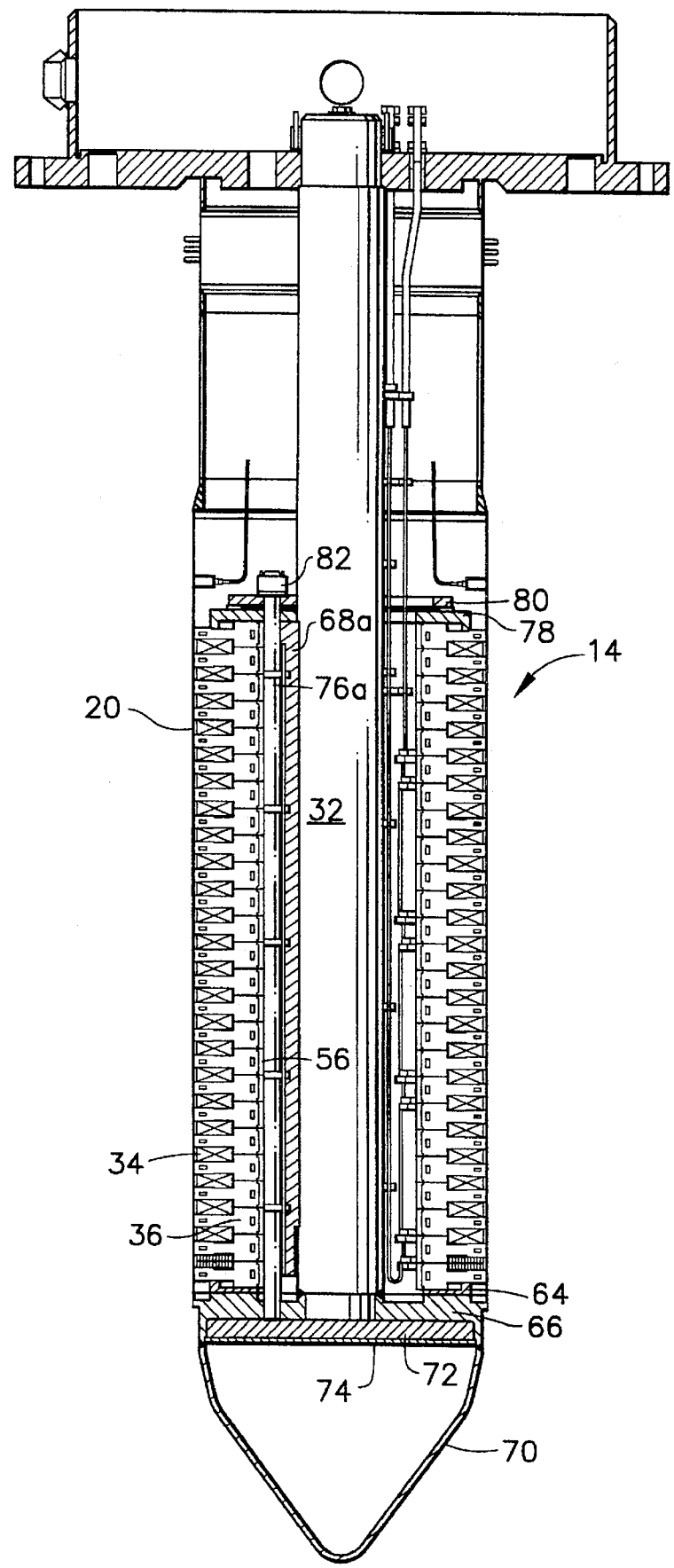
FIG. 2 is a sectional view of an inner stator structure of a double-stator annular linear flow electromagnetic pump in accordance with a preferred embodiment of the invention.

Each lamination ring has a corresponding alignment ring 56, the alignment rings being stacked on top of each other as seen in FIG. 2. The alignment rings 56 are disposed coaxial to the pump centerline axis. As shown in FIG. 3, the last lamination package of each ring may be sized with preferred manufacturing tolerances so that as the bolts 58 draw the package 38 radially inward, the last package is wedged between the adjacent packages to provide a clamping force around the circumference of the inner lamination ring 36. A stepped feature 60 at the alignment ring/ lamination package interface (best seen in FIGS. 6–8) assures common registration of all packages in the same plane.

To maximize the thermal expansion of the inner stator 14, the alignment ring 56 is made of a high-thermal-expansion alloy, such as Type 304 or 316 stainless steel. Thus, the expansion rate of the inner lamination ring 36 is a composite of the expansion rates of the alignment ring 56 and the lamination elements 40. In combination with higher operating temperatures, the composite expansion rate is sufficient to assure that the inner lamination ring 36 will experience comparable thermal growth to that experienced by the inner flow duct 20. Thus, the inner lamination ring-to-inner flow duct gap and the inner stator temperatures are minimized.

The inner stator is supported on a support ring 64, which itself is seated on a base 66. The center post 32 and base 66 form an integral, welded structure, made from a pipe (or solid bar) section and a flat discshaped plate, respectively. Three ribs 68a–c (see FIG. 12) are machined from rectangular bar stock and bolted onto the center post at three equally spaced locations around the post periphery. Flats are machined on the center post to more easily accommodate the ribs. The center post, base and ribs are all made of Type 304 stainless steel.

The resulting spine assembly provides complete radial alignment of the inner lamination rings via the ribs 68a–c. The outer diameter of the three ribs is finish machined on a lathe after assembly onto the center post, providing optimum concentricity to the spine axis. The shape thus obtained provides a nearly perfect cylindrical form over which the closely fitting alignment rings (with lamination packages attached) are installed in complete radial alignment.

In plan view, three "bays" are defined by the alignment ring inner diameter, the center post outer diameter and the ribs. Coil-to-coil electrical connections are made in these bays as the stator is built, with all of the coil leads which terminate in a given bay corresponding to a single phase of power. For three-phase power, three bays are required. It is essential that the ratio of the number of lamination packages to the number of ribs be an integer number to avoid interferences in assembly. As seen in FIGS. 5, 7 and 8, grooves 62 and 62' are machined through the stator "back iron" to allow the coil leads to be brought into the three bays, which provide a space in which inner stator electrical connections can be made from coil to coil. Each bay corresponds to one of the three phases of power.

Referring to FIG. 2, a nose cone 70 is welded to a peripheral flange formed on the bottom of base 66 to guide the flow of liquid metal around the inner stator and into the annular flow channel. The lower part of the spine assembly is completed by insulation 72 and a cover plate 74.

Clamping of the stator stack of coils and laminated iron must be provided to prevent damaging flow-induced vibration. In accordance with the design of the present invention, clamping is provided in the axial, radial and circumferential directions, as discussed below.

Figure 9:
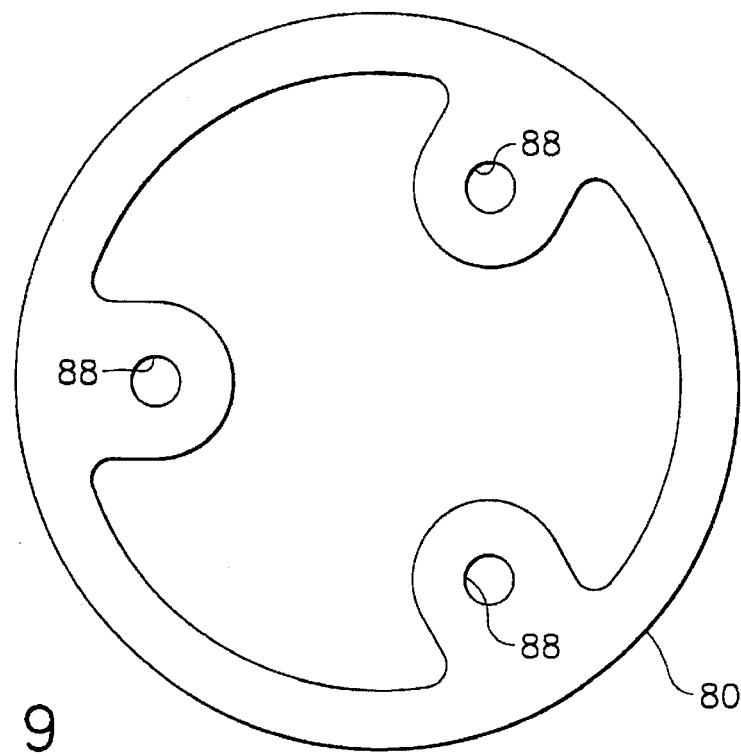
FIG. 9 is a top view of an inner flex ring incorporated in the inner stator structure in accordance with the preferred embodiment of the invention depicted in FIG. 2.
Figure 10:
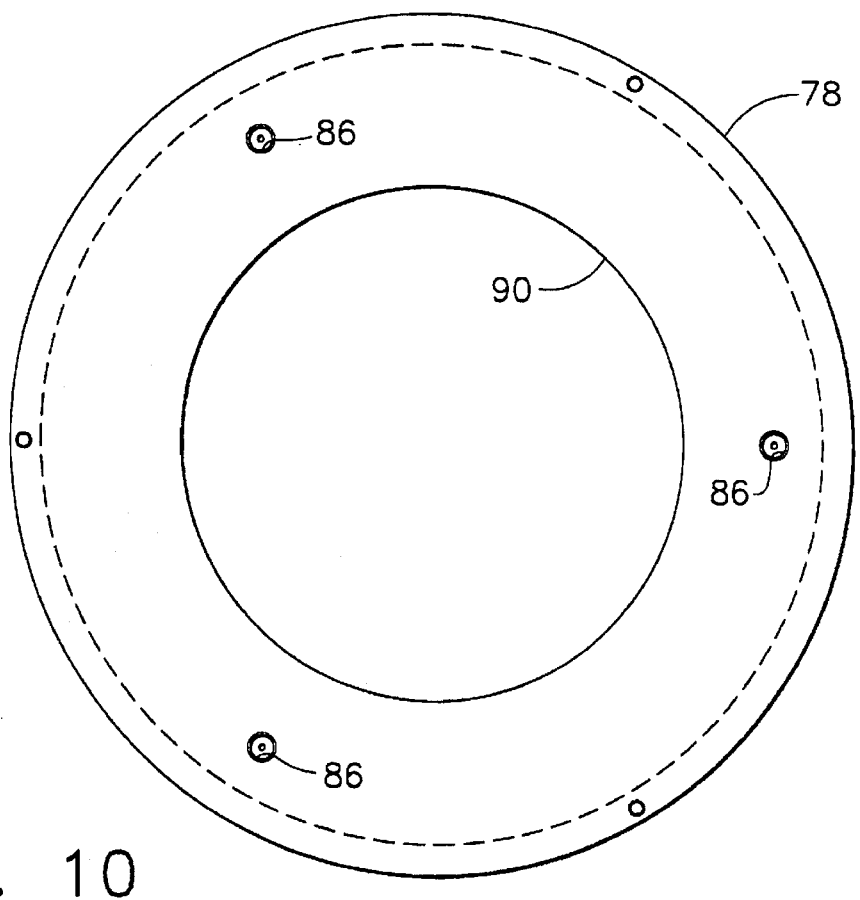
FIG. 10 is a plan view of an inner clamp plate incorporated in the inner stator structure in accordance with the preferred embodiment of the invention depicted in FIG. 2.
Figure 12:
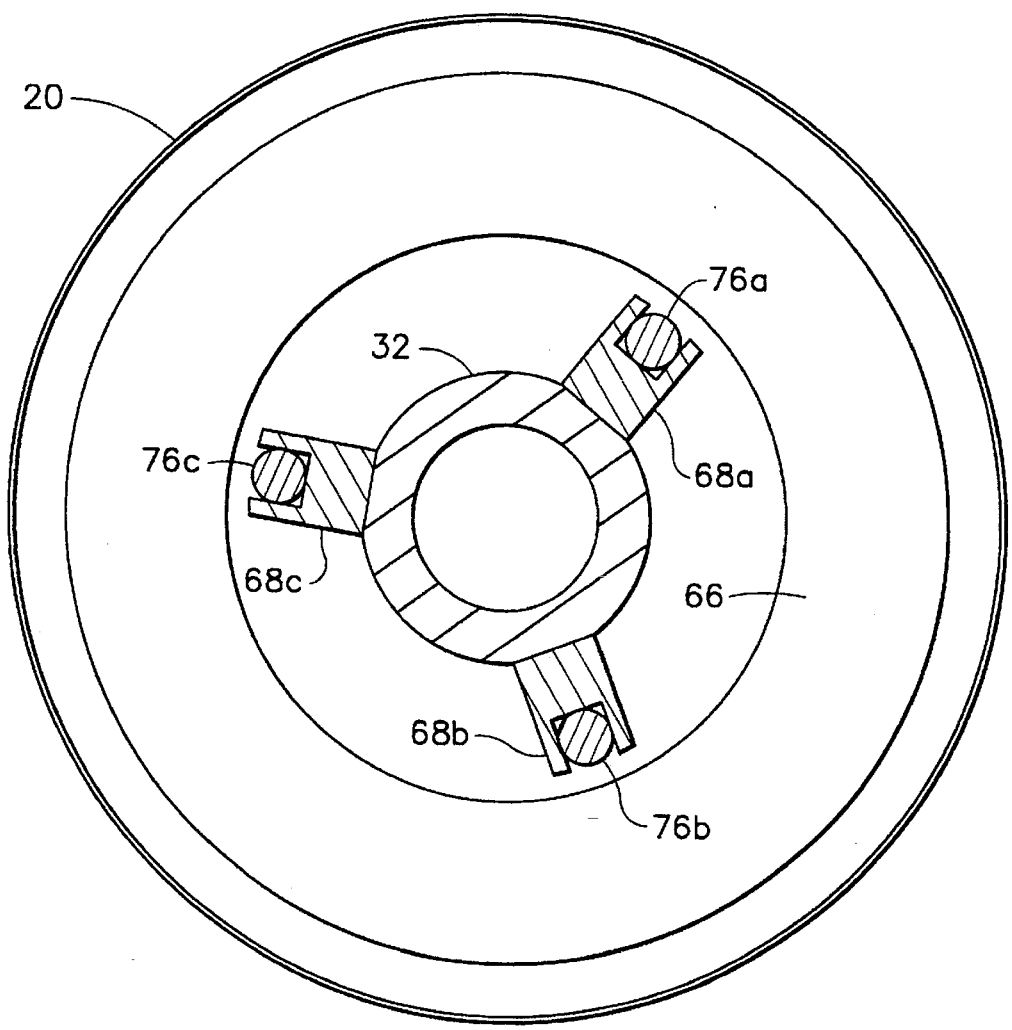
FIG. 12 is a plan view of the spine assembly incorporated in the preferred embodiment shown in FIG. 2.

Referring to FIGS. 2 and 12, inner stator axial clamping is provided by three tie rods 76a–c, a clamp plate 78, a flex plate 80, a torque nut 82 and the inner flow duct 2. The tie rods 76a–c run through longitudinal grooves machined along the outer face of the ribs 58a–c. The lower end of each tie rod is screwed into tapped holes in the base plate 66, as shown in FIG. 2. At the upper end, each tie rod extends through the large central bore of clamp plate 78, defined by inner diameter 90 (see FIG. 10), and through respective holes 88 in flex plate 80 (see FIG. 9) to an extent which is sufficient to accept a threaded torque nut 82 (see FIG. 2). Tightening all three torque nuts tensions the tie rods and compresses the stator lamination elements and coils between the clamp plate 78 and the base plate 66.

Use of Alloy 600 for the tie rods provides good high-temperature mechanical properties while matching approximately the axial thermal expansion coefficient of the carbon steel stator iron. That way, as the stator comes up to operating temperature, the clamping forces do not change dramatically.

Figure 11:
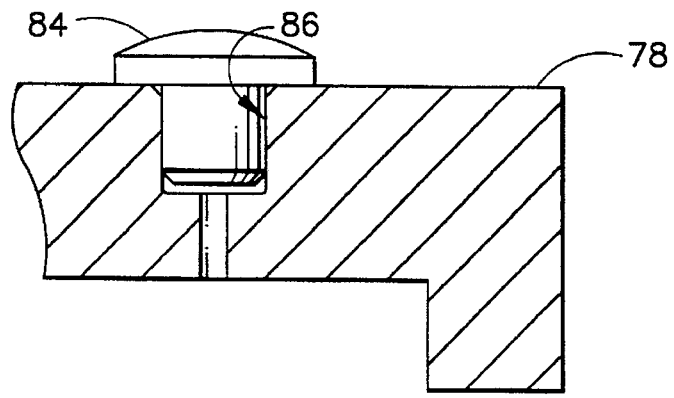
FIG. 11 is a detailed sectional view of a portion of the inner clamp plate of FIG. 10, showing one of the three pins which support the flex ring shown in FIG. 9.

The Type 304 stainless steel clamp plate remains rigid and distributes the clamping forces uniformly across the uppermost lamination ring. Use of Alloy 718 for the flex plate 80 provides very high strength at high temperatures, allowing the flex plate to bend elastically (like a spring) without permanently deforming. The flex plate 80 sits on three rounded bolt heads installed in the clamp plate at the vertices of an equilateral triangle and flexes between the three support points. Each bolt 84 is screwed into a corresponding tapped hole 86 in clamp plate 78, as shown in FIG. 11. Combined with the long slender tie rods, which elongate slightly under tension, a certain amount of compliance is built into the clamping system to accommodate variations in thermal growth between the inner stator and the clamping. In comparison, a perfectly rigid system loses all clamping, or permanently deforms, with the slightest variation in thermal growth.

The inner flow duct 20, which is shrink-fitted over the inner stator column, also provides axial clamping. As the inner flow duct cools after installation, it shrinks axially as well as radially, exerting an additional compressive force on the stator lamination elements and coils.

Radial clamping is provided by the bolting of lamination packages 38 to the alignment rings 56 and shrink fitting of inner flow duct 20 over the stator assembly. Using this combination, the lamination packages are sandwiched between the two ring-like elements and immobilized.

In accordance with the preferred embodiment, steps are taken to minimize any differential thermal growth between the inner stator and the inner flow duct. Bearing in mind that the Type 304 stainless steel inner flow duct has a higher thermal expansion coefficient than the carbon steel lamination rings, one would expect radial clamping from the inner flow duct to be lost as the inner stator is brought up to operating temperature.

Mounting the stator lamination packages to the Type 304 stainless steel alignment rings, however, provides a composite radial expansion rate approximately midway between that of carbon steel and Type 304 stainless steel. In addition, the internal volume of the inner stator operates at a higher temperature than the inner flow duct (which is cooled by the pumped fluid), so that the spine assembly and alignment ring have, under normal operating conditions, an integrated thermal growth similar to that of the duct. Combined with the initial shrink fit of the duct, radial clamping is thusly maintained under virtually all expected operating conditions.

Finally, circumferential clamping is provided to keep the lamination elements from vibrating in the direction perpendicular to their major plane. As shown in FIGS. 4–8, semi-circular strips 48 and 50 of flat stock are respectively inserted like hot rivets into slots 44 and 46 in a bundle of lamination elements. These strips, and the thicker plates 52 and 54 at each side of a lamination package 38, are made of Alloy 600. This alloy matches approximately the thermal expansion coefficient of the lamination elements 40 but has much better mechanical properties at high temperature.

The preferred embodiment of the invention has been disclosed for the purpose of illustration. Variations and modifications of the disclosed structure which do not depart from the concept of this invention will be readily apparent to engineers skilled in the design of electromagnetic pumps. All such variations and modifications are intended to be encompassed by the claims set forth hereinafter.

We claim:

1. A lamination ring for an inner stator of a double-stator electromagnetic pump, comprising:

a circular alignment ring;

a multiplicity of lamination elements; and means for fixedly securing said plurality of lamination elements to said alignment ring so that said lamination elements are substantially not axially displaceable relative to said alignment ring.

2. The inner lamination ring as defined in claim 1, further comprising means for bundling said lamination elements into a plurality of lamination packages, each of said lamination packages comprising a respective plurality of said multiplicity of lamination elements, wherein said attaching means comprise means for attaching each of said lamination packages to said alignment ring such that each of said lamination elements has an end surface which abuts a circular cylindrical surface of said alignment ring.

3. A lamination ring for an inner stator of a double-stator electromagnetic pump, comprising:

a circular alignment ring;

a multiplicity of lamination elements;

means for bundling said lamination elements into a plurality of lamination packages, each of said lamination packages comprising a respective plurality of said multiplicity of lamination elements; and means for attaching each of said lamination packages to said alignment ring such that each of said lamination elements has an end surface which abuts a circular cylindrical surface of said alignment ring, wherein for each of said lamination packages, said bundling means comprises a strip of metal form-locked in a slot which passes through each of the lamination elements of said respective lamination package, and said attaching means comprises a bolt which engages a tapped hole in said form-locked strip.

4. The inner lamination ring as defined in claim 1, wherein said alignment ring has first and second circumferential projections extending radially outward, and each of said lamination elements comprises a radially inwardly projecting portion which fits between said first and second circumferential projections of said alignment ring.

5. The inner lamination ring as defined in claim 1, wherein each of said multiplicity of lamination elements comprises a tapered plate having a thickness which increases linearly in a radial direction.

6. The inner lamination ring as defined in claim 1, wherein each of said multiplicity of lamination elements is made of a first metal having a first thermal expansion coefficient and said alignment ring is made of a second metal different than said first metal and having a second thermal expansion coefficient greater than said first thermal expansion coefficient.

7. The inner lamination ring as defined in claim 6, wherein said first metal is carbon steel and said second metal is Type 304 or 316 stainless steel.

8. A linear flow electromagnetic induction pump comprising:

an inner stator and an outer stator for impelling liquid metal through an annular flow channel therebetween, each of said inner and outer stators comprising a multiplicity of alternately stacked lamination rings and coils;

a central support post;

a base plate secured to a bottom end of said post, said stack of lamination rings and coils of said inner stator being supported by said base plate;

an axially clamping plate in the shape of a disk surrounding said post and being in contact with the topmost lamination ring of said inner stator stack;

a plurality of tie rods each having a bottom end secured to said base plate;

elastic means for exerting a clamping force via said axially clamping plate which compresses said lamination rings and coils of said inner stator stack; and means for adjusting the clamping force exerted by said elastic means, wherein said adjusting means are threadably coupled to said tie rods.

9. The electromagnetic induction pump as defined in claim 8, wherein said adjusting means comprises a plurality of torque nuts, each of said torque nuts being threadably coupled to a top portion of a respective one of said plurality of tie rods.

10. The electromagnetic induction pump as defined in claim 8, further comprising a plurality of support means, each of said support means being mounted on said axially clamping plate for transferring said clamping force from said elastic means to said second axially clamping plate, said plurality of support means being circumferentially distributed at equal angular intervals about a centerline axis of said pump.

11. The electromagnetic induction pump as defined in claim 8, wherein said elastic means comprises a ring-shaped member having a corresponding plurality of holes for receiving said plurality of tie rods.

12. The electromagnetic induction pump as defined in claim 8, wherein said elastic means comprises a ring-shaped member made of Alloy 718.

13. The electromagnetic induction pump as defined in claim 8, wherein said tie rods are made of Alloy 600.

14. The electromagnetic induction pump as defined in claim 8, further comprising a nose cone for deflecting flow into said annular flow channel.

15. A linear flow electromagnetic induction pump comprising a spine assembly, an inner stator and an outer stator for impelling liquid metal through an annular flow channel therebetween, said inner stator comprising a multiplicity of alternately stacked inner lamination rings and inner coils, wherein each of said inner lamination rings comprises:

a circular alignment ring having a concentric position relative to a centerline axis of said spine assembly;

a multiplicity of lamination elements; and means for attaching said plurality of lamination elements to said alignment ring.

16. The electromagnetic induction pump as defined in claim 15, wherein said spine assembly comprises a plurality of longitudinal ribs circumferentially distributed at equal angular intervals on and attached to a center post.

17. The electromagnetic induction pump as defined in claim 15, wherein said spine assembly further comprises a base secured to a bottom end of said center post, said stack of inner lamination rings and inner coils being supported by said base plate, further comprising an axially clamping plate in the shape of a disk surrounding said center post and being in contact with the topmost inner lamination ring, and a plurality of tie rods each having a bottom end secured to said base plate, each one of said tie rods being arranged in a respective longitudinal channel formed by a longitudinal recess formed in a radially outer surface of a respective rib and the inner circumferential surfaces of a stack of said alignment rings.

18. The electromagnetic induction pump as defined in claim 17, further comprising:

elastic means for exerting a clamping force via said axially clamping plate which compresses said stack of inner lamination rings and inner coils; and means for adjusting the clamping force exerted by said elastic means, wherein said adjusting means are threadably coupled to said tie rods.

19. The electromagnetic induction pump as defined in claim 15, wherein each of said multiplicity of lamination elements is made of a first metal having a first thermal expansion coefficient and said alignment rings are made of a second metal different than said first metal and having a second thermal expansion coefficient greater than said first thermal expansion coefficient.

20. The electromagnetic induction pump as defined in claim 19, further comprising inner and outer flow ducts arranged concentrically with said annular flow channel therebetween, said inner flow duct surrounding said inner lamination rings and being made of said second metal.

* * * * *